US010326328B2

(12) United States Patent
Bao et al.

(10) Patent No.: US 10,326,328 B2
(45) Date of Patent: Jun. 18, 2019

(54) ELECTRIC PUMP

(71) Applicant: Zhejiang Sanhua Automotive Components Co., LTD., Hangzhou, Zhejiang (CN)

(72) Inventors: Junfeng Bao, Zhejiang (CN); Qiang Ning, Zhejiang (CN); Bingjiu Yin, Zhejiang (CN); Zhiping Huang, Zhejiang (CN)

(73) Assignee: Zhejiang Sanhua Automotive Components Co., LTD, Hangzhou (CN)

( * ) Notice: Subject to any disclaimer, the term of this patent is extended or adjusted under 35 U.S.C. 154(b) by 347 days.

(21) Appl. No.: 15/296,137

(22) Filed: Oct. 18, 2016

(65) Prior Publication Data

US 2017/0126089 A1 May 4, 2017

(30) Foreign Application Priority Data

Oct. 30, 2015 (CN) .......................... 2015 1 0730750

(51) Int. Cl.
*H02K 1/04* (2006.01)
*H02K 5/10* (2006.01)
(Continued)

(52) U.S. Cl.
CPC ........... *H02K 5/10* (2013.01); *F04D 13/0626* (2013.01); *F04D 13/0653* (2013.01);
(Continued)

(58) Field of Classification Search
CPC ...................................................... H02K 5/12
(Continued)

(56) References Cited

U.S. PATENT DOCUMENTS 6,129,529 A 10/2000 Young et al.
8,282,367 B2 * 10/2012 Ihle ..................... F04D 29/5893
310/86
(Continued)

FOREIGN PATENT DOCUMENTS

CN 202545275 U 11/2012
CN 203239584 U 10/2013
(Continued)

OTHER PUBLICATIONS

European Search Report Application No. 16195464.9: dated Mar. 31, 2017.
(Continued)

*Primary Examiner* — Alexander Talpalatski
(74) *Attorney, Agent, or Firm* — Boyle Fredrickson S.C.

(57) ABSTRACT

An electric pump is provided according to the application, which includes a housing, a shaft, an impeller, a rotor assembly, a stator assembly and an inner chamber. The shaft, the impeller and a rotor are arranged in the inner chamber. The housing includes a first housing, a partition and a second housing, and the partition divides the inner chamber into a wet chamber and at least one dry chamber. The partition includes a first side wall, a first bottom, a second side wall and a second bottom. The second side wall isolates the rotor assembly and the stator assembly. An outer peripheral surface of the second side wall is provided with reinforcing ribs, and the reinforcing ribs improve the strength of the second side wall.

8 Claims, 7 Drawing Sheets

(51) Int. Cl.
*F04D 13/06* (2006.01)
*H02K 5/128* (2006.01)
*H02K 1/14* (2006.01)
*H02K 1/27* (2006.01)
*H02K 3/18* (2006.01)
*H02K 5/22* (2006.01)
*F04D 29/02* (2006.01)
*F04D 29/22* (2006.01)

(52) U.S. Cl.
CPC .......... *F04D 29/026* (2013.01); *H02K 1/146* (2013.01); *H02K 1/2706* (2013.01); *H02K 3/18* (2013.01); *H02K 5/128* (2013.01); *H02K 5/22* (2013.01); *F04D 29/22* (2013.01); *H02K 2005/1287* (2013.01)

(58) Field of Classification Search
USPC .......................................................... 310/43
See application file for complete search history.

(56) References Cited

U.S. PATENT DOCUMENTS

| | | | | |
|---|---|---|---|---|
| 9,184,645 | B2* | 11/2015 | Riehl | .................... H02K 5/128 |
| 2007/0290568 | A1* | 12/2007 | Ihle | ....................... H02K 1/145 |
| | | | | 310/257 |
| 2008/0197731 | A1 | 8/2008 | Kusano | |
| 2009/0081059 | A1* | 3/2009 | Seki | .................... F04D 13/064 |
| | | | | 417/420 |
| 2014/0205480 | A1* | 7/2014 | Nakano | ............... F04D 29/4293 |
| | | | | 417/420 |
| 2015/0184674 | A1 | 7/2015 | Lee | |

FOREIGN PATENT DOCUMENTS

| | | |
|---|---|---|
| CN | 204226292 U | 3/2015 |
| CN | 204532856 U | 8/2015 |
| JP | 2006057729 A | 3/2006 |
| JP | 2009284704 A | 12/2009 |
| JP | 2010038069 A | 2/2010 |
| JP | 2013253610 A | 12/2013 |
| WO | 2013047027 A1 | 4/2013 |

OTHER PUBLICATIONS

Korean Office Action dated Jan. 30, 2018 in Application No. 10-2016-0138312.

* cited by examiner

ELECTRIC PUMP

CROSS-REFERENCE TO RELATED APPLICATIONS

The present application claims the benefit of priority to Chinese patent application No 201510730750.9 titled "ELECTRIC PUMP", filed with the Chinese State Intellectual Property Office on Oct. 30, 2015, the entire disclosure of which is incorporated herein by reference.

FIELD OF THE INVENTION

This application relates to a thermal management system, and particularly relates to an electric pump.

BACKGROUND OF THE INVENTION

In recent decades, an electric pump has gradually replaced a conventional mechanical pump and has been widely used in a thermal management system. The electric pump has following advantages such as small electromagnetic interference, high efficiency, environmental protection, and etc., which can meet the requirements of the market well.

The electric pump includes a rotor assembly and a stator assembly, and the rotor assembly and the stator assembly are completely isolated by a partition, thus an issue of liquid leakage is avoided. In a conventional arrangement, the partition divides a pump inner chamber into a set chamber for receiving the rotor assembly and a dry chamber for receiving the stator assembly. To ensure the transfer efficiency of magnetic fields of the rotor assembly and the stator assembly the partition should be as thin as possible. However, the strength of the partition may thus be weakened.

Therefore, it is necessary to improve the conventional technology for addressing the above technical issues.

SUMMARY OF THE INVENTION

An electric pump is provided by the present application, which includes a partition, and the strength of the partition is improved without affecting magnetic fields of the rotor assembly and the stator assembly.

A following technical solution is adopted according to the present application. An electric pump includes a housing, a shaft, a rotor assembly, a stator assembly, and an inner chamber, the rotor assembly is arranged in the inner chamber the rotor assembly is rotatable about a central axis of the shaft, and the rotor assembly includes a permanent magnet, and the housing includes a partition, the partition divides the inner chamber into a wet chamber and at least one thy chamber, the rotor assembly is arranged in the wet chamber, and the stator assembly is arranged in the dry chamber, the partition is formed by injection molding by taking the shaft as an insert, the partition is provided with an inner cavity, the partition includes a first side wall, a first bottom, a second side wall and a second bottom, the first bottom and the second bottom are distributed in a substantially stepped shape, the second bottom is fixed to the shaft by injection molding, the first side wall surrounds the first bottom, the second side wall isolates the permanent magnet from the stator assembly, the partition includes first reinforcing ribs, each of the first reinforcing ribs protrudes towards an external of the second side wall, the first reinforcing rib extends in a height direction of the second side wall, the height direction is a direction from the second bottom to the first bottom, the first reinforcing ribs are distributed at intervals along an outer peripheral surface of the second side wall.

Compared with the conventional technology, in the present application, the electric pump includes a partition, and a side wall of the partition isolates the stator assembly from the rotor assembly. Reinforcing ribs protruding towards an external of the side wall, extending in a height direction of the side wall and distributed along a circumferential direction of the side wall are formed on an outer peripheral surface of the side wall of the partition. With such an arrangement, since the distance between the stator assembly and the rotor assembly is not increased, the strength of the partition can be improved while the adverse effect on the magnetic fields is relatively small.

DETAILED DESCRIPTION

The present application is further described hereinafter in conjunction with drawings and embodiments.

Figure 1:
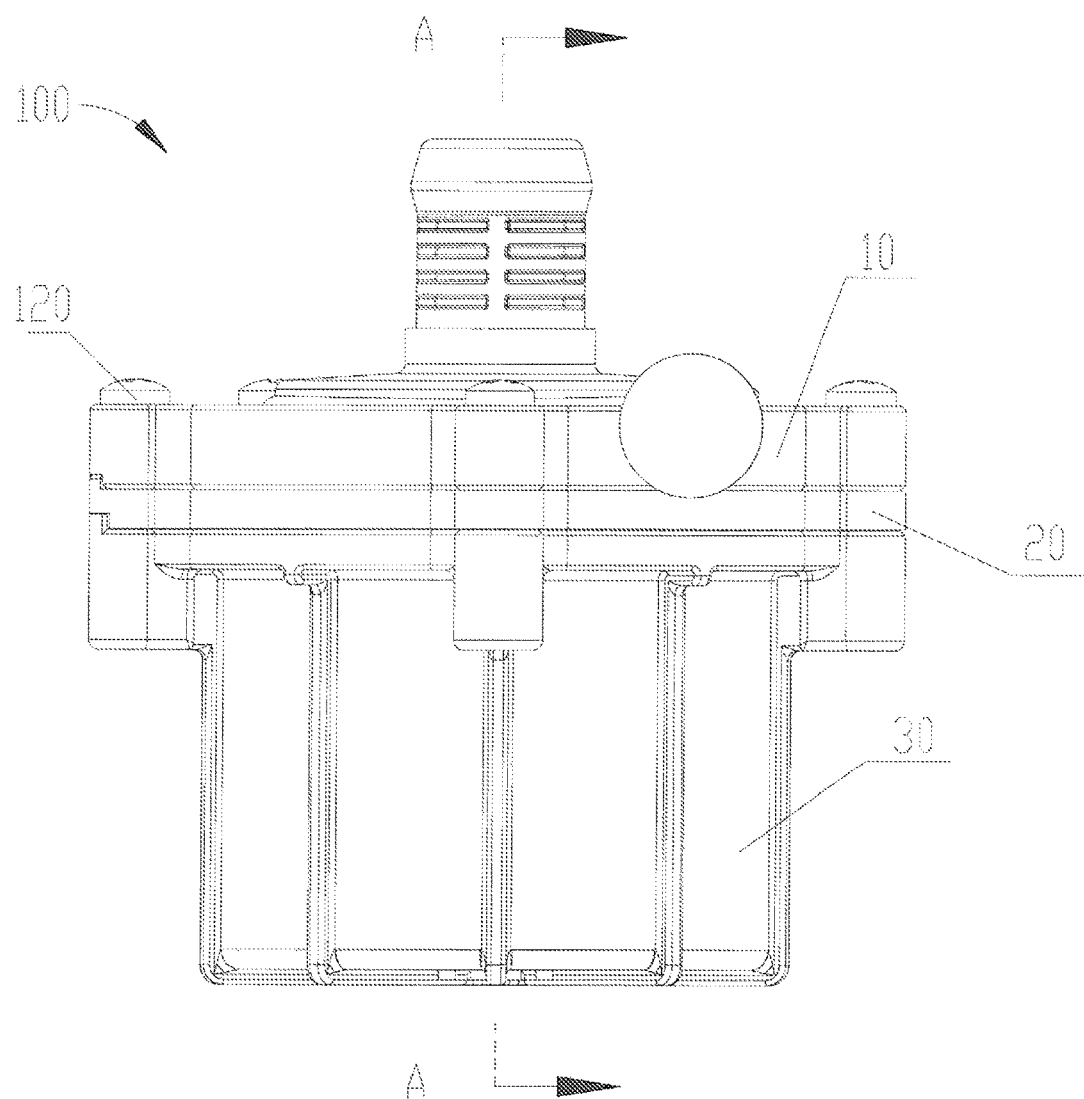
FIG. 1 is a schematic view showing an electric pump according to an embodiment of the present application in one direction.
Figure 2:
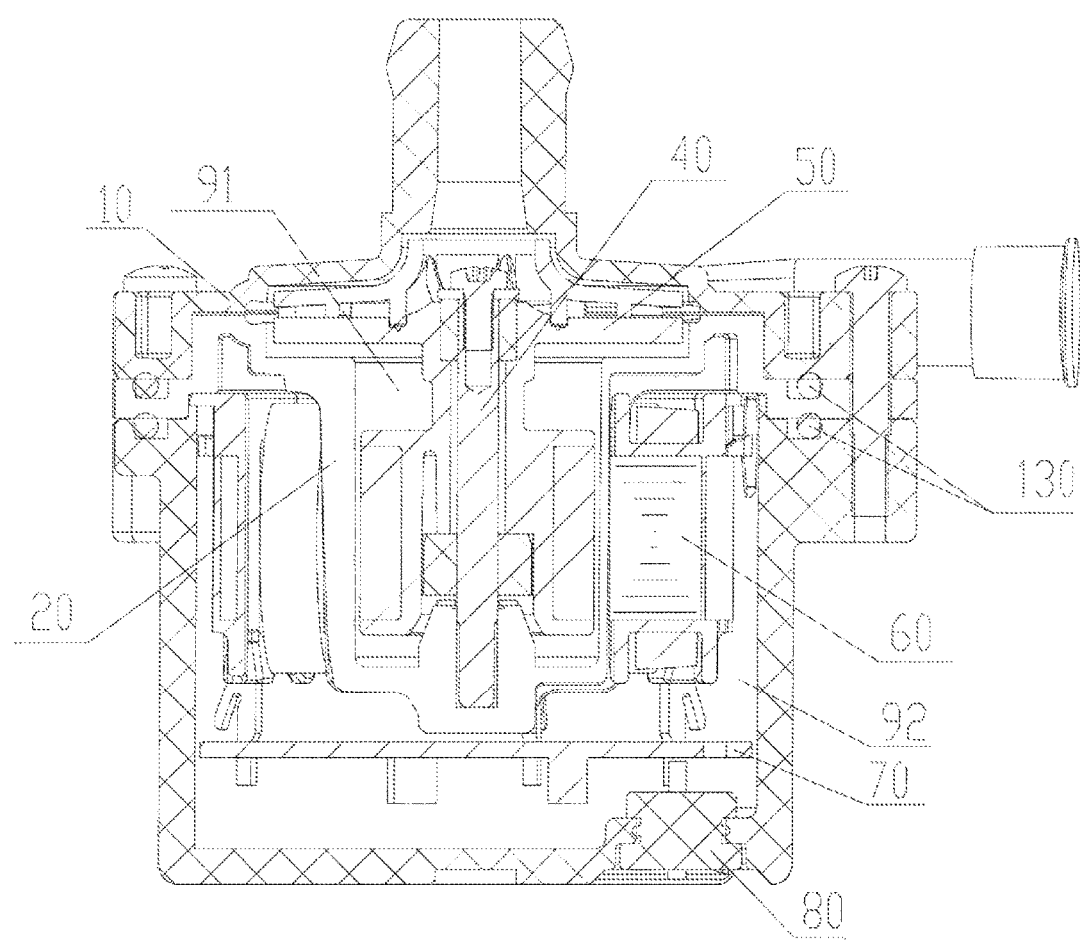
FIG. 2 is a schematic sectional view showing the structure of the electric pump shown in FIG. 1 taken along A-A.
Figure 3:
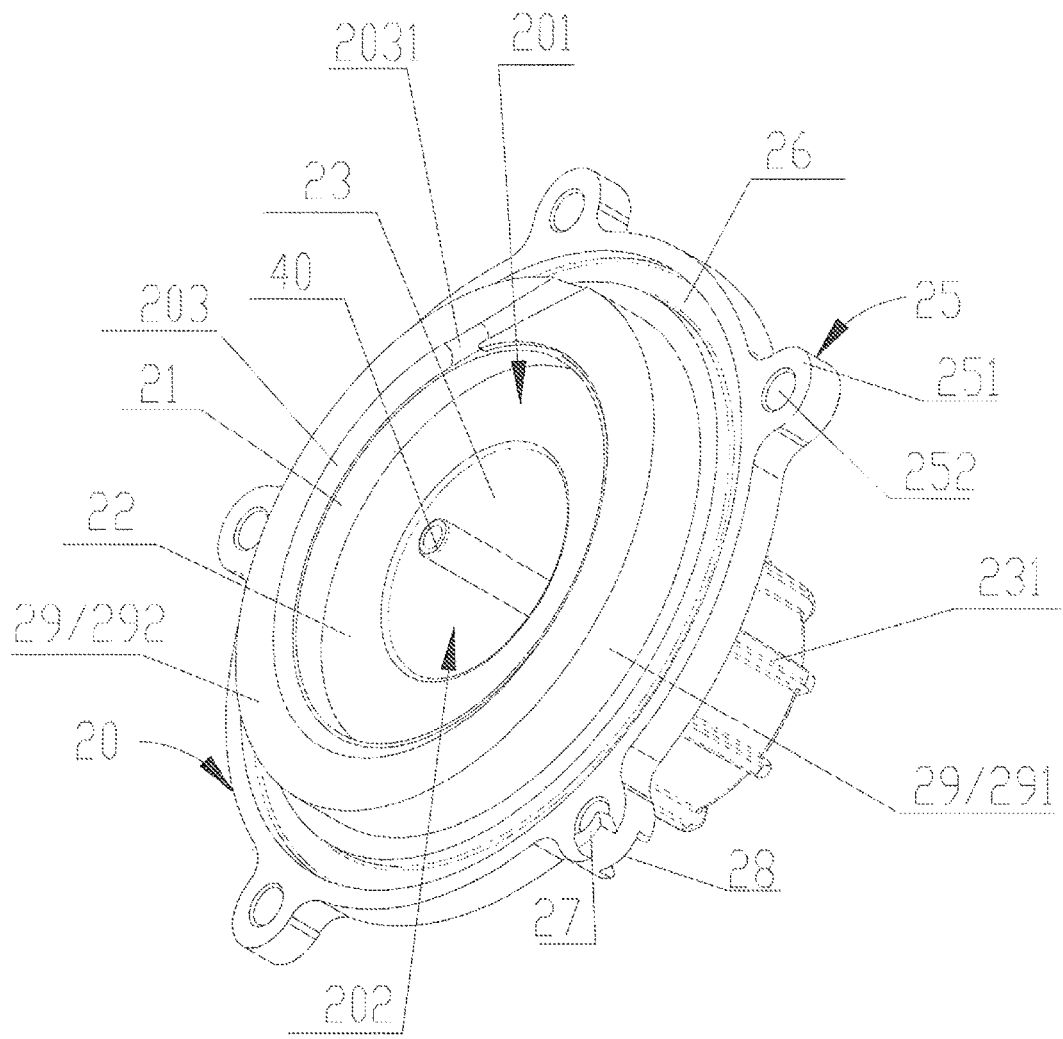
FIG. 3 is a schematic perspective view showing the structure of a partition assembly of the electric pump shown in FIG. 2 in one direction.
Figure 4:
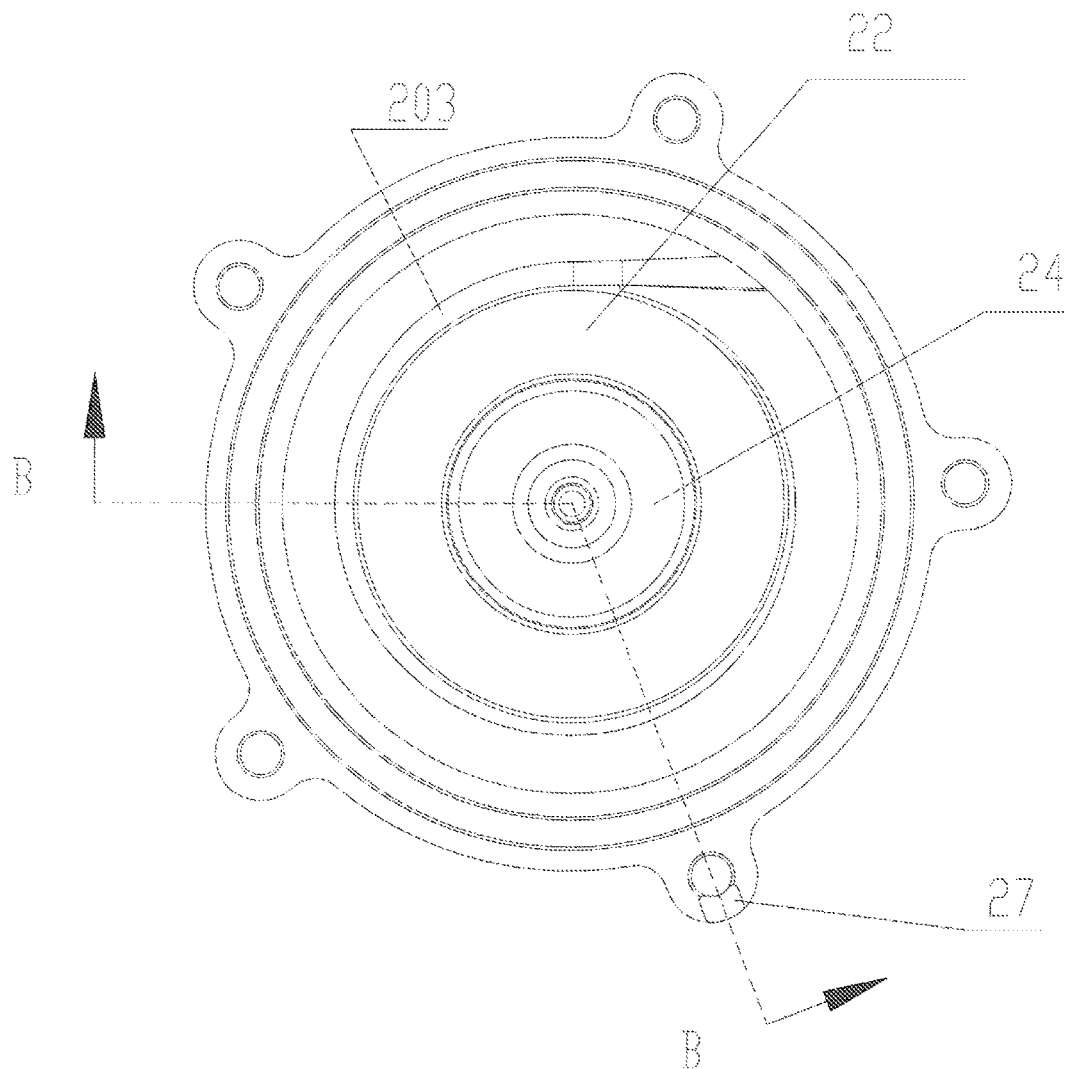
FIG. 4 is a schematic top view showing the structure of the partition assembly shown in FIG. 3.
Figure 5:
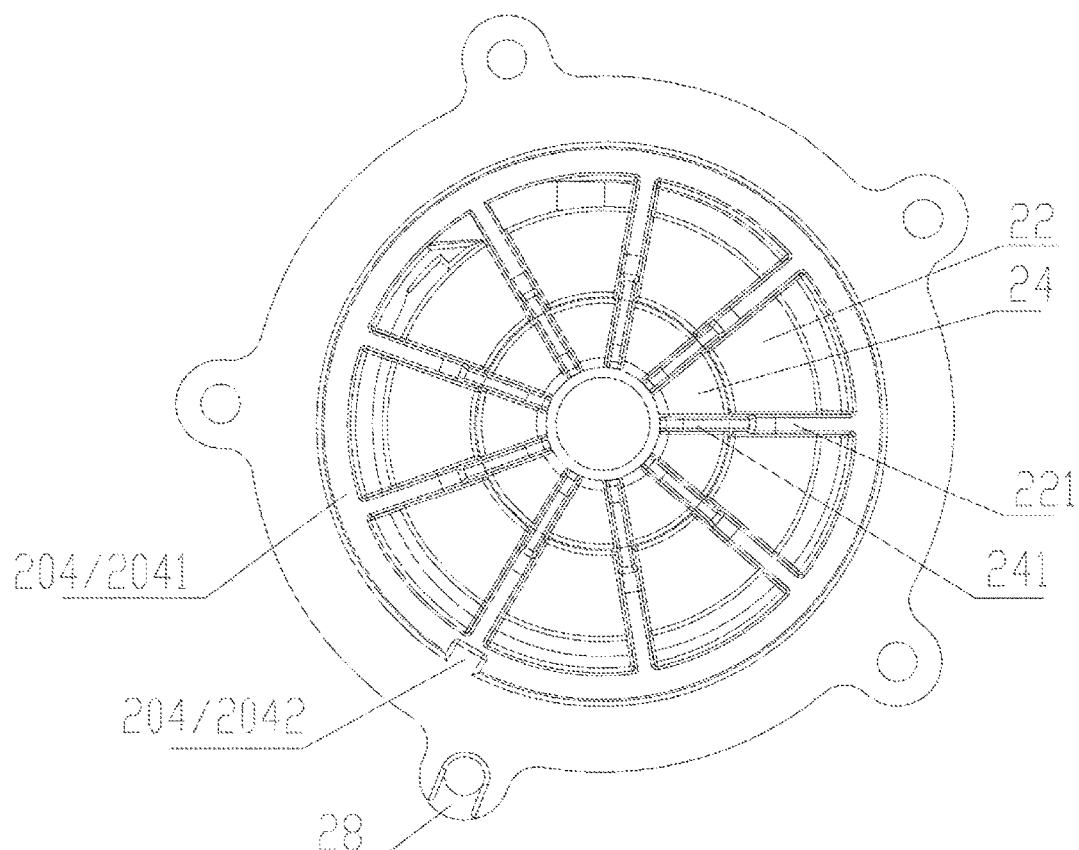
FIG. 5 is a schematic bottom view showing the structure of the partition assembly shown in FIG. 3.
Figure 6:
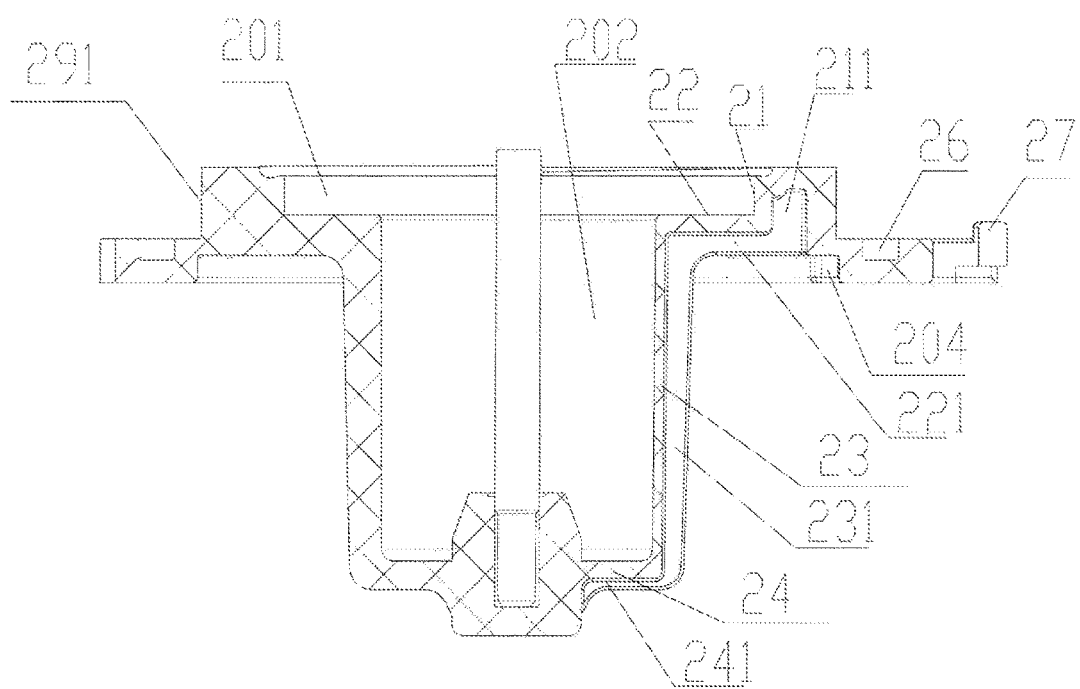
FIG. 6 is a schematic sectional view showing the structure of the partition assembly shown in FIG. 4 taken along B-B.

Reference is made to FIG. 1, which is a schematic view showing the structure of an embodiment of an electric pump 100. The electric pump 100 includes a housing, and an inner chamber. In this embodiment the housing includes a first housing 10, a partition 20, and a second housing 30. In this embodiment, the first housing 10, the partition 20 and the second housing 30 are respectively injection molded. The first housing 10 is fixed to the partition 20 by a screw 120 or by a bolt, and the partition 20 is fixed to the second housing 30 by a screw 120 or by a bolt. A connecting portion between the first housing 10 and the partition 20 and a connecting portion between the partition 20 and the second housing 30 are each provided with a sealing ring 130 (referring to FIG. 2), thus the tightness of the connecting portions is improved. Referring to FIG. 2, the partition 20 divides the inner chamber into a wet chamber 91 and a dry chamber 92. The wet chamber 91 allows a working medium to flow through, and no working medium flows through the dry chamber 92. Apparently, the housing may also be other structures. The structure of the housing adopted in this embodiment has a relative simple manufacturing process, and parts and components of the housing are convenient to assemble. The electric pump 100 in this embodiment is mainly used in a thermal management system, and the thermal management system includes a cooling circulation system and/or a heating circulation system, or in other word, the thermal management system is a fluid circulation system. The electric pump 100 is mainly to provide a circulation power for a circulating medium. The electric pump 100 in this embodiment may be applied in a vehicle cooling circulation system or a heating circulation system.

Referring to FIG. 2, the electric pump 100 further includes a shaft 40, a rotor assembly 50, a stator assembly 60 a circuit board 70, and a rubber assembly 80. The rotor assembly 50 is arranged in the wet chamber 91, and the stator assembly 60 and the circuit board 70 are arranged in the dry chamber 92. The shaft 40 is fixed to the partition 20 by injection molding, and the rotor assembly 50 is rotatable about the shaft 40. The rotor assembly 50 includes an impeller and a rotor, and the rotor includes a permanent magnet. The rotor assembly 50 is partitioned front the stator assembly 60 by the partition 20, and the stator assembly 60 is electrically connected to the circuit board 70. The circuit board 70 is electrically connected to an external power supply or a signal circuit or the like by connecting wires, and the connecting wires are led to an outside of the electric pump by the rubber assembly 80. In this embodiment, the electric pump 100 is an inner rotor type electric pump, and the inner rotor type electric pump refers a pump in which the permanent magnet of the rotor assembly 50 is arranged to be closer to the shaft 40 than the stator assembly 60 by taking the shaft 40 as a central axis.

Reference is made to FIGS. 3 to 6, which are schematic views showing the structure of a partition assembly. The partition assembly includes the partition 20 and the shaft 40, and the partition assembly is an injection molded assembly including the partition 20 which is formed by injecting molding by taking the shaft 40 as an insert. The partition 20 includes a first cavity 201 and a second cavity 202. The first cavity 201 and the second cavity 202 are in communication with each other. A part of the impeller of the rotor assembly 50 is located in the first cavity 201, and at least the permanent magnet of the rotor assembly 50 is located in the second cavity 202. In the case that the first housing 10 is fixed to the partition 20, the wet chamber 91 includes the first cavity 201 and the second cavity 202.

The partition 20 includes a first side wall 21, a first bottom 22, a second side wall 23, a second bottom 24, a connecting portion 25, a mounting groove 26, a first limiting portion 27, a second limiting portion 28, a positioning portion 29 and an outflow side wall 203. The first cavity 201 includes a space enclosed by the first side wall 21 and the first bottom 22, and the second cavity 202 includes a space enclosed by the second side wall 23 and the second bottom 24. The positioning portion 29 is arranged at a periphery of the first side wall 21 for positioning the first housing 10, which ensures that the first cavity 201 is coaxial with the inner chamber. The mounting groove 26 is arranged at a periphery of the positioning portion 29 for receiving the sealing ring 130 between the first housing 10 and the partition 20. The connecting portion 25 is arranged at a periphery of the mounting groove 26 of the sealing ring for being, fixed to the first housing 10 and the second housing 30. The first limiting portion 27 and the second limiting portion 28 are integrated with the connecting portion 25. The first funning portion 27 and the second limiting portion 28 are used for determining mounting positions of the first housing 10 and the second housing 30 with respect to the partition 20. The outflow side wall 203 is integrated with the first side wall 21, and the outflow side wall 203 and the first housing 10 together form an outflow channel, through which a working medium flows out of the wet chamber 91. In this embodiment, the shaft 40 is fixed to the second bottom 24 by injection molding. At all injection molded portion where the second bottom 24 is fixed to the shaft 40 by injection molding, the second bottom 24 forms a positioning towards an internal of the second cavity 202, such that the thickness of the second bottom 24 at the injection molded portion, where the second bottom 24 is cooperated with the shaft 40, is increased, which may facilitate improving the connection strength of the partition 20 and the shaft 40.

The connecting portion 25 includes lugs 251 and through holes 252 respectively extending through an upper end surface and a lower end surface of the lugs 251. The lugs 251 each protrude from an outer peripheral surface of the partition 20, and are distributed at intervals along the outer peripheral surface of the partition 20. In this embodiment, the connecting portion 25 includes five lugs 251, and each of which includes a through hole 252. The thickness of the connecting portion 25 is substantially equal to the depth of the mounting groove 26, which facilitates improving the strength of the connecting portion 25.

The connecting portion 25 and the mounting groove 26 are arranged adjacent to an outer edge of the partition 20, and the mounting groove 26 includes an annual groove formed between the first side wall 21 and the connecting portion 25 of the partition 20.

The first limiting portion 27 and the second limiting portion 28 are arranged at one of the lugs 251 of the connecting portion 25 of the partition 20. In this embodiment, the first limiting portion 27 includes a protruding portion formed at an upper surface of the lug 251, and the second limiting portion 28 includes a notch formed at a lower surface of the lug 251, and the protruding portion and the notch are arranged corresponding to each other, which may ensure a uniform thickness of the lug, thereby ensuring the injection molding process and the deformation rate of the injection molding. In addition, the first limiting portion 27 may also be formed at more than one for example two lugs, and the first housing is accordingly structured in order to achieve limitation in position. Furthermore, the second limiting portion 28 may be formed in two or more lugs, and even at all of the lugs, and only one or two of the lugs cooperates with the second housing for position limitation.

The positioning portion 29 cooperates with the first housing 10. Specifically, the positioning portion 29 includes a third side wall 291 and a top 292. The third side wall 291 and the top 292 are substantially perpendicular to each other, and the third side wall 291 is substantially parallel with the first side wall 21. In the case that the first housing 10 is assembled with the partition 20, the third side wall 291 is in contact with a corresponding portion of the first housing 10 in a radial direction, and the top 292 is spaced apart by a certain distance from a corresponding portion of the first housing 10 in an axial direction. Such design may ensure the tightness of the wet chamber at the place where the first housing 10 and the partition 20 are connected.

The outflow side wall 203 is arranged at the place where the top 292 of the positioning portion 29 is connected to the first side wall 21. The outflow channel includes a space between the outflow side wall 203 and the first housing 10. The outflow channel is an involute structure, such that the working pressure of a working medium is increased gradually and reaches a maximum working pressure at an outlet 2031. In this embodiment, the outflow channel includes a space formed between the outflow side wall 203 formed in the partition 20 and a part formed in the first housing 10. This two-part structure facilitates the machining of the outflow channel.

The partition 20 further includes a third limiting portion 204, and the third limiting portion 204 includes an axial limiting portion and a radial limiting portion. The axial limiting portion includes a first mounting surface 2041 formed on the partition 20, which limits the position of an upper end surface of the stator assembly 60 when the upper end surface of the stator assembly 60 is in contact with the first mounting surface 2041. The radial hunting portion includes a protruding portion 2042 formed on the partition 20, and the protruding portion 2042 is used for limiting the rotation of the stator assembly 60 with respect to the partition 20.

An outer surface of the second side wall 23 includes at least two first reinforcing ribs 231, and each of the first reinforcing ribs 231 protrudes out of the outer peripheral Surface of the second side wall 23 and extends towards the second bottom 24. The first reinforcing ribs 231 are distributed at equal intervals along the outer peripheral surface of the second side wall 23. The second side wall 23 is used for isolating the rotor assembly 50 from the stator assembly 60, thus, in order to ensure the magnetic force between the stator assembly 60 and the rotor assembly 50, the second side wall 23 is generally relatively thin. The first reinforcing ribs 231 can improve the strength of the second side wall 23. The number of the first reinforcing ribs 231 is the same as the number of tooth spaces of stator teeth of the stator assembly 60. In this way, the first reinforcing ribs 231 may be inserted into the tooth spaces of the stator assembly 60, which may not only improve the strength of the second side wall 23, but also avoid an increase of the distance between the stator assembly 60 and the rotor assembly 50. The width of the first reinforcing rib 231 is slightly less than a gap of the tooth space of adjacent stator teeth of the stator assembly 60. This may facilitate assembling of the stator assembly 60 and the partition assembly. Apparently, a groove may be formed on an inner peripheral surface of each of stator teeth, and the number of the first reinforcing ribs is the same as the total number of the tooth spaces and the groove. The first reinforcing ribs are corresponding to the tooth spaces and the groove. Therefore, the number of the first reinforcing ribs may be less than, equal to or greater than the number of the tooth spaces.

An outer surface of the second bottom 24 includes multiple second reinforcing ribs 241, and each of the second reinforcing ribs 241 protrudes outwards along the second bottom and extends radially along an external of the second bottom 24. The second reinforcing ribs 241 are radially distributed on the second bottom 24 for improving the strength of the second bottom 24. In this embodiment, each of the second reinforcing ribs 241 is formed by the first reinforcing rib 231 extending from the second side wall 23 to the second bottom 24. In this way, the first reinforcing rib 231 and the second reinforcing rib 241 are connected integrally to each other, and the second bottom 24 and the second side wall 23 are connected integrally to each other by the first reinforcing ribs 231 and the second reinforcing ribs 241 as well, which may facilitate improving the strength of the place where the second bottom 24 is connected to the second side wall 23. Apparently, the first reinforcing rib 231 and the second reinforcing rib 241 may also be connected integrally by a transition portion.

An outer surface of the first bottom 22 includes multiple third reinforcing ribs 221, and the third reinforcing ribs 221 each protrude outwards along the first bottom 22 and each extend radially along the outer surface of the first bottom 2. The third reinforcing ribs 221 are radially distributed for improving the strength of the first bottom 22. In this embodiment, the third reinforcing rib 221 is formed by the first reinforcing rib 231 extending to the first bottom 22. In this way, the third reinforcing rib 221 is integrated with the first reinforcing rib 231, and the first bottom 22 and the second side wall 2 are connected to each other by the first reinforcing ribs 231 and the third reinforcing ribs 221, which may facilitate improving the strength of a place where the first bottom 22 is connected to the second side wall 23. Apparently, the first reinforcing rib and the third reinforcing rib may be connected integrally by a transition portion.

An outer surface of the first side all 21 includes multiple fourth reinforcing ribs 211, and the fourth reinforcing ribs 211 and the first reinforcing ribs 231 extend in a same direction. The fourth reinforcing ribs 211 are distributed at intervals along a circumference of the outer peripheral surface of the first side wall 21 for improving the strength of the first side wall 21. In this embodiment, the fourth reinforcing rib 211 is formed by the third reinforcing rib 221 extending to the first side wall 21. In this way, the fourth reinforcing rib 211 and the third reinforcing rib 221 are formed integrally, and the first bottom 22 and the first side wall 21 are connected to each other by the third reinforcing rib 221 and the fourth reinforcing rib 211, which may facilitate improving the strength of a place where the first bottom 22 is connected to the first side wall 21. Apparently, the third reinforcing rib and the fourth reinforcing rib may also be connected integrally by a transition portion.

In this embodiment, the first reinforcing rib 231, the second reinforcing rib 241, the third reinforcing rib 221 and the fourth reinforcing rib 211 are formed on the outer peripheral surface of the partition for improving the strength of the partition. Furthermore, the first reinforcing, rib 231, the second reinforcing rib 241, the third reinforcing rib 221 and the fourth reinforcing rib 211 are connected integrally. In this way, the strength of places where parts of the partition are connected to each other is improved, and the machining is relatively simple. Furthermore, the first reinforcing rib 231 may be connected integrally to the second reinforcing rib 241 by a transition portion, the first reinforcing rib 231 may be connected integrally to the third reinforcing rib 221 by a transition portion, the third reinforcing rib 221 may also be connected integrally to the fourth reinforcing rib 211 by a transition portion. Apparently, the first reinforcing rib 231, the second reinforcing rib 241, the third reinforcing rib 221 and the fourth reinforcing rib 211 may be formed separately or arranged misaligned, but in all of these cases, the strength of corresponding parts of the partition may be improved by the reinforcing ribs without increasing the thickness of the partition.

Figure 7:
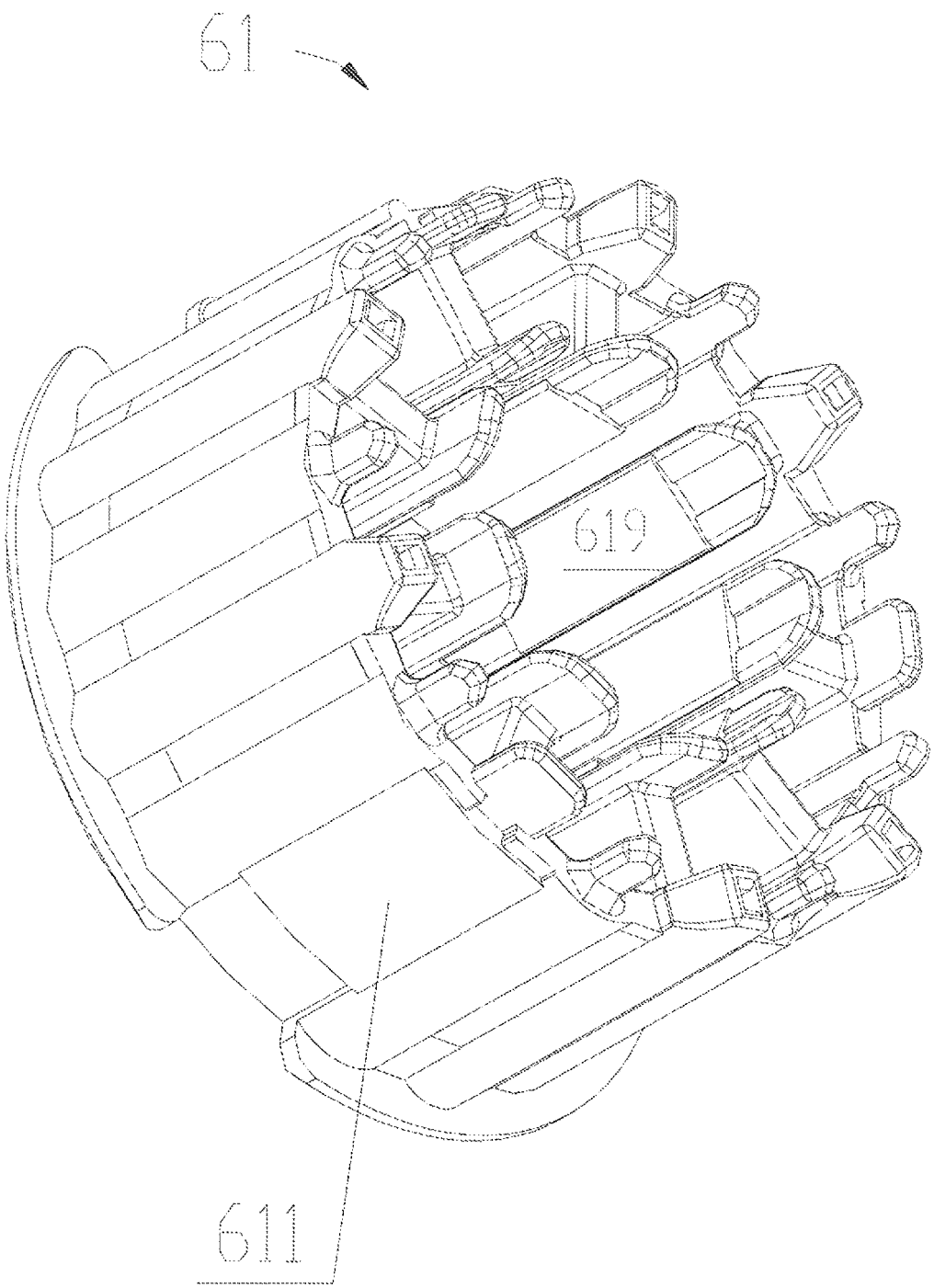
FIG. 7 is a schematic perspective view showing the structure of an injection molded stator of the stator assembly of the electric pump shown in FIG. 2.

In this embodiment, the height of the second reinforcing rib 241 is less than or equal to the height of the first reinforcing rib 231, the height of the first reinforcing rib 231 is less than or equal to the height of the thud reinforcing rib 221, and the height of the third reinforcing rib 221 is less than or equal to the height of the fourth reinforcing rib 211. Such arrangement may improve the strength of each of the corresponding parts of the partition while adverse effect on performance is small. The heights of the reinforcing ribs refer to perpendicular distances of free ends in parallel with the outer surface of the partition, of the reinforcing ribs at various parts from the outer surface of the partition. FIG. 7 is a schematic view showing an injection molded stator of the stator assembly 60, and the stator assembly 60 includes an injection molded stator 61 and winding (not shown in Figures). The injection molded stator 61 includes stator teeth 619, and the winding is wound around the stator teeth 619 of the injection molded stator 61 in a certain rule. The injection molded stator 61 includes a stator core 611 and an injection molded layer covering the stator core 611. The injection molded stator 61 including the injection molded layer is formed by injecting molding using an injection molding material by taking the stator core 611 as an insert A tooth space is formed between adjacent stator teeth 619, and thus, the stator teeth 619 are spaced apart by a certain distance, and the tooth space is used for winding the winding or receiving the winding. Apparently, the inner peripheral surface of each of the stator teeth 619 includes a groove, and the groove may adjust an air gap between the stator assembly 60 and the permanent magnet of the rotor assembly 50.

It should be noted that, the above embodiments are only intended for describing the present application, and should not be interpreted as limitation to the technical solutions of the present application. Although the present application is described in detail in conjunction with the above embodiments, it should be understood by the skilled in the art that, modifications or equivalent substitutions may still be made to the present application by those skilled in the art; and any technical solutions and improvements of the present application without departing from the spirit and scope of the present invention also fall into the scope of the present application defined by the claims.

The invention claimed is:

1. An electric pump, comprising a housing, a shaft, a rotor assembly, a stator assembly, and an inner chamber, the rotor assembly is arranged in the inner chamber, the rotor assembly is rotatable about a central axis of the shaft, and the rotor assembly comprises a permanent magnet, and the housing comprises a partition, the partition divides the inner chamber into a wet chamber and at least one dry chamber, the rotor assembly is arranged in the wet chamber, and the stator assembly is arranged in the dry chamber, the partition is formed by injection molding by taking the shaft as an insert, the partition is provided with an inner cavity, the partition comprises a first side wall, a first bottom, a second side wall and a second bottom, the first bottom and the second bottom are distributed in a substantially stepped shape, the second bottom is fixed to the shaft by injection molding, the first side wall surrounds the first bottom, the second side wall isolates the permanent magnet from the stator assembly, the partition comprises first reinforcing ribs, each of the first reinforcing ribs protrudes towards an external of the second side wall, the first reinforcing rib extends in a height direction of the second side wall, the height direction is a direction from the second bottom to the first bottom, the first reinforcing ribs are distributed at intervals along an outer peripheral surface of the second side wall, wherein the partition comprises second reinforcing ribs, each of the second reinforcing ribs is formed on an outer surface of the second bottom, the second reinforcing ribs are radially distributed on the second bottom, and the distribution density of the second reinforcing ribs gradually decreases from a relative central area of the second bottom to an outer edge of the second bottom, wherein the partition comprises third reinforcing ribs, each of the third reinforcing ribs protrudes towards the external of the partition from the first bottom, and the third reinforcing ribs are radially distributed on the first bottom from a relative central area of the first bottom to an outer edge of the first bottom.

2. The electric pump according to claim 1, wherein the stator assembly comprises a stator core, the stator core comprises stator teeth, and a tooth space is formed between adjacent stator teeth, the number of the first reinforcing ribs is the same as the number of the tooth space, the thickness of the first reinforcing rib is slightly less than the width of the tooth space, and the first reinforcing rib is at least partially arranged in a corresponding tooth space.

3. The electric pump according to claim 1, wherein the stator assembly comprises a stator core, the stator core comprises stator teeth, and a tooth space is formed between adjacent stator teeth, and an inner peripheral surface of each of the stator teeth comprises a groove, the number of the first reinforcing ribs is the same as the total number of tooth space and the groove, the first reinforcing ribs are corresponding to the tooth spaces and the grooves.

4. The electric pump according to claim 1, wherein the number of the second reinforcing ribs is the same as the number of the first reinforcing ribs, the partition comprises a transition portion, and an end of the first reinforcing rib is connected to an end of the second reinforcing rib by the transition portion.

5. The electric pump according to claim 1, wherein the number of the third reinforcing ribs is the same as the number of the first reinforcing ribs, the partition comprises a transition portion, and an end of the first reinforcing rib is connected to an end of the third reinforcing rib by the transition portion.

6. The electric pump according to claim 1, wherein the partition comprises fourth reinforcing ribs, and each of the fourth reinforcing ribs protrudes towards the external of the partition from the first side wall, the fourth reinforcing ribs are distributed at intervals along a circumference of the first side wall, and the fourth reinforcing rib extend in a height direction of the first side wall.

7. The electric pump according to claim 6, wherein the number of the fourth reinforcing ribs is the same as the number of the third reinforcing ribs, the partition comprises a transition portion, and an end of the fourth reinforcing rib is connected to an end of the third reinforcing rib by the transition portion.

8. The electric pump according to claim 7, wherein the height of the second reinforcing rib is less than or equal to the height of the first reinforcing rib, the height of the first reinforcing rib is less than or equal to the height of the third reinforcing rib, the height of the third reinforcing rib is less than or equal to the height of the fourth reinforcing rib, the heights are perpendicular distances from free ends of the reinforcing ribs to an outer surface of the partition.

* * * * *